(12) United States Patent
Schlintl et al.

(10) Patent No.: US 11,873,745 B2
(45) Date of Patent: Jan. 16, 2024

(54) METHOD AND DEVICE FOR DETERMINING THE ICING STATUS OF A COMPONENT OF THE EXHAUST GAS SYSTEM OF A MOTOR VEHICLE THAT IS NOT ARRANGED DIRECTLY IN THE EXHAUST GAS MASS FLOW

(71) Applicant: Vitesco Technologies GmbH, Regensburg (DE)

(72) Inventors: Gernot Schlintl, Parsberg (DE); Alexander Zimmerer, Rottenburg (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 17/656,641

(22) Filed: Mar. 26, 2022

(65) Prior Publication Data
US 2022/0213830 A1    Jul. 7, 2022

Related U.S. Application Data

(63) Continuation of application No. PCT/EP2020/074573, filed on Sep. 3, 2020.

(30) Foreign Application Priority Data

Sep. 26, 2019   (DE) .................. 10 2019 214 766

(51) Int. Cl.
*F01N 11/00* (2006.01)
*F01N 9/00* (2006.01)

(52) U.S. Cl.
CPC ............ *F01N 11/002* (2013.01); *F01N 9/005* (2013.01); *F01N 2260/024* (2013.01);
(Continued)

(58) Field of Classification Search
CPC .. F01N 11/00; F01N 11/002; F01N 2260/024; F01N 2550/00; F01N 2550/04;
(Continued)

(56) References Cited

U.S. PATENT DOCUMENTS

| | | | |
|---|---|---|---|
| 7,404,291 B2 * | 7/2008 | Endo | ................... F01N 11/002 60/284 |
| 2018/0179940 A1 * | 6/2018 | Hall | ................... B01D 46/446 |

FOREIGN PATENT DOCUMENTS

| | | |
|---|---|---|
| DE | 102006028701 A1 | 12/2006 |
| DE | 112011100614 T5 | 1/2013 |
| DE | 102015208480 A1 | 11/2016 |

OTHER PUBLICATIONS

International Search Report and Written Opinion dated Nov. 16, 2020 from corresponding International Patent Application No. PCT/EP2020/074573.
(Continued)

*Primary Examiner* — Anthony Ayala Delgado

(57) ABSTRACT

The disclosure relates to a method for determining the icing condition of a component of the exhaust-gas system of a motor vehicle that is not arranged directly in the exhaust-gas mass flow and/or of the feed line of the component. The method includes: determining a water quantity actually present in the component and in the feed line thereof and the state of aggregation of the water quantity; determining an energy quantity required for deicing and for volatilizing the water quantity; and determining an energy quantity supplied for deicing and for volatilizing the water quantity by radiated heat from components arranged directly in the exhaust-gas mass flow of the exhaust-gas system of the motor vehicle to the surroundings. The method also includes determining the icing condition of the component by comparing the
(Continued)

energy quantity supplied for deicing and for volatilization with the energy quantity required for deicing and for volatilization.

13 Claims, 1 Drawing Sheet

(52) U.S. Cl.
CPC .. *F01N 2560/08* (2013.01); *F01N 2900/1406* (2013.01); *F01N 2900/1628* (2013.01)

(58) Field of Classification Search
CPC ........... F01N 2560/028; F01N 2560/08; F01N 2900/1406; F01N 2900/1628; F01N 3/023; F01N 3/10; F01N 9/005
See application file for complete search history.

(56) References Cited

OTHER PUBLICATIONS

German Office Action dated May 13, 2020 for corresponding German Patent Application No. 10 2019 214 766.6.

\* cited by examiner

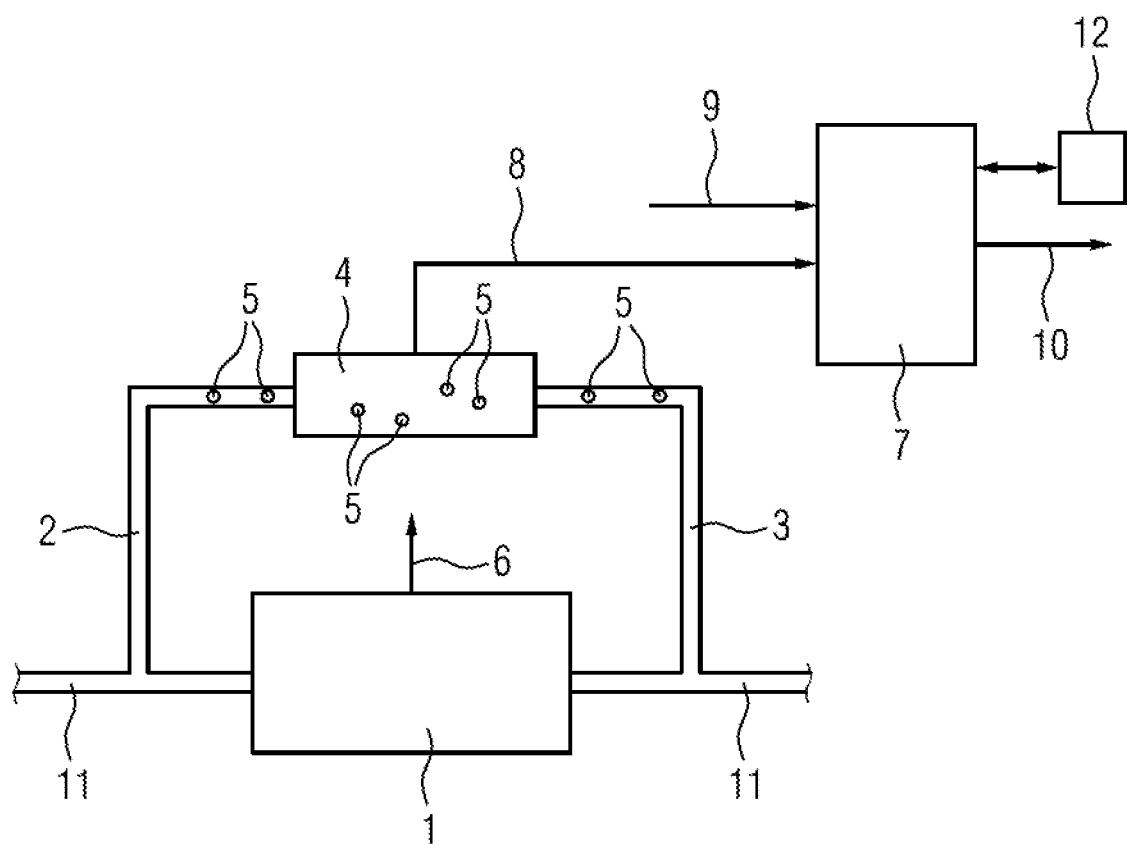

METHOD AND DEVICE FOR DETERMINING THE ICING STATUS OF A COMPONENT OF THE EXHAUST GAS SYSTEM OF A MOTOR VEHICLE THAT IS NOT ARRANGED DIRECTLY IN THE EXHAUST GAS MASS FLOW

CROSS-REFERENCE TO RELATED APPLICATIONS

This application claims the benefit of PCT Application PCT/EP2020/074573, filed Sep. 3, 2020, which claims priority to German Application 10 2019 214 766.6, filed Sep. 26, 2019. The disclosures of the above applications are incorporated herein by reference.

TECHNICAL FIELD

The disclosure relates to a method and a device for determining the icing condition of a component of the exhaust-gas system of a motor vehicle that is not arranged directly in the exhaust-gas mass flow.

BACKGROUND

Water forms in the exhaust-gas system of a motor vehicle as a result of the combustion of fuel. Furthermore, condensation water forms in the exhaust-gas system as a result of cooling of the exhaust gas.

This water can also become stuck in components of the exhaust-gas system that are not arranged directly in the exhaust-gas mass flow and can freeze in the presence of low outside temperatures. These components include, for example, a differential pressure sensor that is connected to the exhaust-gas system via connecting lines.

If these components connected to the exhaust-gas system using connecting lines freeze, then they cannot send any valid data relating to operating states of the motor vehicle to an engine control unit of the motor vehicle, such that the engine control unit cannot provide correct control signals for the operation of the motor vehicle.

It is therefore necessary to determine the icing condition of the components of the exhaust-gas system that are not arranged directly in the exhaust-gas mass flow, and of the feed lines of the components, such that the engine control unit can suppress an output of erroneous control signals if it is detected that one or more components of the exhaust-gas system, and the respective feed line of the components, have iced up.

The output signals from pressure sensors are already known to calculate a pressure drop and to compare the pressure drop with a threshold value, in order to detect ice formation in tubular elements of a charge-air cooler. If the pressure drop is greater than the threshold value, then it is assumed that ice formation is present.

A water injection device of an internal combustion engine and a method for operating such a water injection device are known. In this device, the presence of icing of the water tank and/or of the suction line is detected using a temperature or fill level sensor.

Furthermore, it is already known to perform a dewpoint detection which, as input parameters, includes information relating to the exhaust-gas mass flow and the exhaust-gas temperature. This solution is disadvantageous because it does not relate to the actual mass flow to the sensor, and also does not provide any information relating to the actual sensor temperature.

SUMMARY

The disclosure provides a method for determining the icing condition of a component of the exhaust-gas system of a motor vehicle that is not arranged directly in the exhaust-gas mass flow, and/or of the feed line of the component. The method provides more precise information relating to the icing condition of the component of the exhaust-gas system and/or of the feed line of the component.

One aspect of the disclosure provides a method for determining the icing condition of a component of the exhaust-gas system of a motor vehicle that is not arranged directly in the exhaust-gas mass flow and/or of the feed line of the component. The method includes the following steps: determining a water quantity actually present in the component and in the feed line thereof and the state of aggregation of the water quantity; determining an energy quantity required for deicing and for volatilizing the water quantity actually present in the component and in the feed line thereof; and determining an energy quantity supplied for deicing and for volatilizing the water quantity actually present in the component and in the feed line thereof by means of the radiated heat from components arranged directly in the exhaust-gas mass flow of the exhaust-gas system of the motor vehicle to the surroundings. The method also includes the step of determining the icing condition of the component by comparing the energy quantity supplied for deicing and for volatilization with the energy quantity required for deicing and for volatilization.

Implementations of the disclosure may include one or more of the following optional features. In some implementations, the determination of the water quantity actually present in the component and in the feed line thereof and of the state of aggregation of the water quantity is performed using a model of the exhaust-gas system.

In some examples, the component is identified as being free from ice and free from water if the energy quantity supplied for deicing and for volatilization is greater than the energy quantity required for deicing and for volatilization.

In some examples, the component is identified as not being free from ice and not being free from water if the energy quantity supplied for deicing and for volatilization is less than the energy quantity required for deicing and for volatilization.

The component of the exhaust-gas system of a motor vehicle that is not arranged directly in the exhaust-gas mass flow may be a sensor. The component of the exhaust-gas system of a motor vehicle that is not arranged directly in the exhaust-gas mass flow may be a differential pressure sensor. In some examples, the components of the exhaust-gas system that are arranged directly in the exhaust-gas mass flow are an exhaust-gas catalytic converter, a pipe element, and a particle filter.

Another aspect of the disclosure provides a device for determining the icing condition of a component of the exhaust-gas system of a motor vehicle and/or of the feed line of the component. The device executing the method described above.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 shows a schematic exemplary system for determining the icing condition of a component of the exhaust-gas system of a motor vehicle and/or of the feed line of the component.

DETAILED DESCRIPTION

Referring to FIG. 1, the component that is not arranged directly in the exhaust-gas mass flow of exhaust-gas system 11 is a differential pressure sensor 4. The differential pressure sensor 4 is connected to the inlet of a particle filter 1 using a feed line 2 and to the outlet of the particle filter 1 using a feed line 3. During the operation of the motor vehicle, this differential pressure sensor 4 provides an engine control unit 7 with sensor signals 8 which include information relating to the pressure difference between the inlet and the outlet of the particle filter 1.

Water may be present both in the feed line 2 and in the feed line 3 and also in the differential pressure sensor 4 during the operation of the motor vehicle, as illustrated by the water droplets 5 shown in the FIGURE. This water is, for example, water that was formed during the combustion of fuel in the cylinders of the motor vehicle, or condensation water that was formed as a result of the cooling of the exhaust gas in the exhaust-gas system of the motor vehicle.

In addition to the particle filter 1, the exhaust-gas system of the motor vehicle also has further components, which include, for example, an exhaust-gas catalytic converter and one or more pipe elements.

The reference number 6 is the radiated heat $Q_{loss,surroundings}$ of the particle filter 1 to the surroundings, which can be determined by the engine control unit 7 from the ambient temperature, the temperature of the particle filter 1 and the energy introduced into the particle filter 1. The energy introduced is determined using the temperature of the exhaust gas, the exhaust-gas mass flow and the exhaust-gas composition (exothermic) and the possible water quantity in the particle filter 1 (dewpoint). The aforementioned determinations are performed by the engine control unit 7 using input signals 9, which are further sensor signals.

In the presence of low outside temperatures, this water can freeze in the aforementioned feed lines to the differential pressure sensor and also in the differential pressure sensor itself. This has the result that the differential pressure sensor of the engine control unit of the motor vehicle cannot provide correct information relating to the differential pressure.

The present disclosure provides a method by which the engine control unit 7 is provided with correct and precise information relating to the icing condition of the differential pressure sensor 4 and of the lines 2, 3 leading to the differential pressure sensor 4. For as long as the differential pressure sensor 4 and/or the feed lines 2, 3 thereof are identified as being iced up, the output signals of the differential pressure sensor are blocked or not evaluated by the engine control unit 7. If the differential pressure sensor 4 and the feed lines 2, 3 thereof are identified as not being iced up, then the output signals of the differential pressure sensor 4 are allowed or evaluated by the engine control unit 7 in order to provide control signals 10 for the operation of the engine using the measured differential pressure and the model of the exhaust-gas system 11 stored in the memory 12.

In the method according to the disclosure, to determine the icing condition of the differential pressure sensor 4 and/or of the feed lines 2, 3 thereof, a determination of a water quantity actually present in the differential pressure sensor 4 and in the feed lines 2, 3 thereof, and of the state of aggregation of the water quantity, is firstly performed. This determination is performed using a model of the water quantity actually present in the differential pressure sensor 4 and in the feed lines 2, 3 thereof and of the state of aggregation of the water quantity. In the determination of the state of aggregation, it is identified whether the water is in the solid, liquid or gaseous state. The data corresponding to the aforementioned model have been determined empirically and stored in the memory 12.

A determination of the energy quantity required for deicing and for volatilizing the water quantity actually present in the differential pressure sensor 4 and in the feed lines 2, 3 thereof is then performed.

The energy quantity supplied for deicing and for volatilizing the water quantity actually present in the differential pressure sensor 4 and in the feed lines 2, 3 thereof is subsequently determined. This determination is performed using the radiated heat 6 from components arranged directly in the exhaust-gas mass flow of the exhaust-gas system of the motor vehicle to the surroundings. These components of the exhaust-gas system that are present directly in the exhaust-gas mass flow include for example an exhaust-gas catalytic converter, pipe elements and the aforementioned particle filter 1.

The icing condition of the differential pressure sensor 4 is finally determined by comparing the energy quantity supplied for deicing and for volatilization with the energy quantity required for deicing and for volatilization.

Here, the differential pressure sensor 4 is identified as being free from ice and free from water if the energy quantity supplied for deicing and for volatilization is greater than the energy quantity required for deicing and for volatilization.

If, on the other hand, the energy quantity supplied for deicing and for volatilization is less than the energy quantity required for deicing and for volatilization, then the differential pressure sensor 4 is identified as being not free from ice and not being free from water.

The disclosure is not limited to the identification of the icing condition of a differential pressure sensor 4. Alternatively, the identification of the icing condition may also be performed for other sensors connected to the exhaust-gas system via connecting lines, or else for a low-pressure exhaust-gas recirculation line, which can likewise ice up during the operation of a motor vehicle in the presence of low outside temperatures.

As described above, the components of the exhaust-gas system that are arranged directly in the exhaust-gas mass flow are an exhaust-gas catalytic converter, a pipe element and a particle filter 1. As an alternative to this, the exhaust-gas system of the motor vehicle may also include other or further components arranged directly in the exhaust-gas mass flow.

If—as stated above—the method according to the disclosure is performed for a differential pressure sensor connected to the inlet and the outlet of a particle filter, then the following advantages are achieved, among others:

Through the modelling of the conditions at the differential pressure sensor, large safety margins for the allowance of the output signals of the differential pressure sensor, such as are necessitated by inadequate modelling, can be minimized. This minimization allows the measured values provided by the differential pressure sensor to be used more quickly. This in turn leads to better performance of the engine controller. Among other things, a determination of the loading of the particle filter is improved, diagnosis of the particle filter is improved (empty pipe detection; clogged particle filter), a determination of the back-pressure modelling for cylinder charge calculation is improved, more precise boost pressure pilot control is made possible, diagnosis of a supercharging system of the motor vehicle with regard to the presence of a leak or of an actuator fault is improved, and a determination of the exhaust-gas recirculation mass flow and a determination of all supplied and extracted mass flows in the exhaust-gas system and intake system of the motor vehicle are improved.

These advantages can be enhanced further if the method according to the disclosure is also applied to other components of the motor vehicle.

A number of implementations have been described. Nevertheless, it will be understood that various modifications may be made without departing from the spirit and scope of the disclosure. Accordingly, other implementations are within the scope of the following claims.

What is claimed is:

1. A method for determining an icing condition of a sensor of an exhaust-gas system of a motor vehicle that is not arranged directly in an exhaust-gas mass flow, and/or of a feed line of the sensor, the method comprising:
   determining, at an engine control unit of the motor vehicle, a water quantity actually present in the sensor and in the feed line thereof and a state of aggregation of the water quantity;
   determining, at the engine control unit, an energy quantity required for deicing and for volatilizing the water quantity actually present in the sensor and in the feed line thereof;
   determining, at the engine control unit, an energy quantity supplied for deicing and for volatilizing the water quantity actually present in the sensor and in the feed line thereof by radiated heat from components arranged directly in the exhaust-gas mass flow of the exhaust-gas system of the motor vehicle to surroundings;
   determining, at the engine control unit, the icing condition of the sensor by comparing the energy quantity supplied for deicing and for volatilization with the energy quantity required for deicing and for volatilization;
   controlling, at the engine control unit, based on the determination of the icing condition of the sensor, the operation state of the motor vehicle, wherein controlling the operation state of the motor vehicle further includes suppressing, an output of erroneous control signals based on the icing condition of the sensor, where the erroneous control signals are indicative of icing of the sensor.

2. The method of claim 1, wherein determining the water quantity actually present in the sensor and in the feed line thereof and of the state of aggregation of the water quantity is performed using a model of the exhaust-gas system.

3. The method of claim 1, wherein the sensor is identified as being free from ice and free from water when the energy quantity supplied for deicing and for volatilization is greater than the energy quantity required for deicing and for volatilization.

4. The method of claim 1, wherein the sensor is identified as not being free from ice and not being free from water when the energy quantity supplied for deicing and for volatilization is less than the energy quantity required for deicing and for volatilization.

5. The method of claim 1, in which the component of the exhaust-gas system of a motor vehicle that is not arranged directly in the exhaust-gas mass flow is a differential pressure sensor.

6. The method of claim 1, wherein the components of the exhaust-gas system that are arranged directly in the exhaust-gas mass flow include an exhaust-gas catalytic converter, a pipe element and a particle filter.

7. A device for determining an icing condition of a sensor of an exhaust-gas system of a motor vehicle that is not arranged directly in an exhaust-gas mass flow, and/or of a feed line of said component, the device comprising: an engine control unit configured to control a method, the method comprising:
   determining a water quantity actually present in the sensor and in the feed line thereof and a state of aggregation of the water quantity;
   determining an energy quantity required for deicing and for volatilizing the water quantity actually present in the sensor and in the feed line thereof;
   determining an energy quantity supplied for deicing and for volatilizing the water quantity actually present in the sensor and in the feed line thereof by radiated heat from components arranged directly in the exhaust-gas mass flow of the exhaust-gas system of the motor vehicle to surroundings;
   determining the icing condition of the sensor by comparing the energy quantity supplied for deicing and for volatilization with the energy quantity required for deicing and for volatilization;
   controlling, based upon the determination of the icing condition of the sensor, the operation state of the motor vehicle, wherein controlling the operation state of the motor vehicle includes suppressing an output of erroneous control signals based on the icing condition of the sensor, where the erroneous control signals are indicative of icing of the sensor.

8. The device of claim 7, wherein determining the water quantity actually present in the sensor and in the feed line thereof and of the state of aggregation of the water quantity is performed using a model of the exhaust-gas system.

9. The device of claim 7, wherein the sensor is identified as being free from ice and free from water when the energy quantity supplied for deicing and for volatilization is greater than the energy quantity required for deicing and for volatilization.

10. The device of claim 7, wherein the sensor is identified as not being free from ice and not being free from water when the energy quantity supplied for deicing and for volatilization is less than the energy quantity required for deicing and for volatilization.

11. The device of claim 7, wherein the sensor of the exhaust-gas system of the motor vehicle that is not arranged directly in the exhaust-gas mass flow is a sensor.

12. The device of claim 11, in which the sensor of the exhaust-gas system of a motor vehicle that is not arranged directly in the exhaust-gas mass flow is a differential pressure sensor.

13. The device of claim 7, wherein the sensor of the exhaust-gas system that are arranged directly in the exhaust-gas mass flow include an exhaust-gas catalytic converter, a pipe element and a particle filter.

* * * * *